Figure 1:
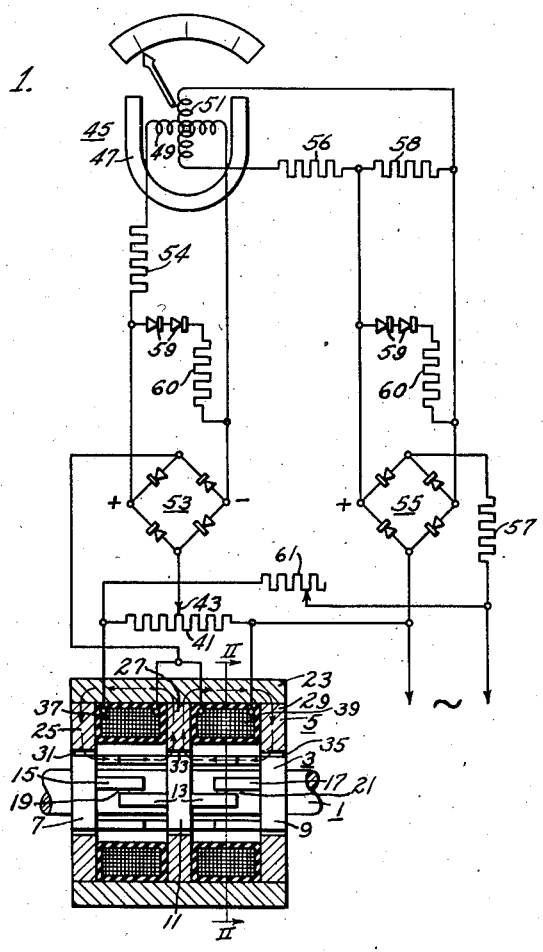

July 18, 1944.    B. F. LANGER    2,354,129

STRAIN MEASURING SYSTEM

Filed Nov. 19, 1942

WITNESSES:
Leon M. Garman
E. F. Oberheim

INVENTOR
Bernard F. Langer.
BY
Paul E. Friedemann
ATTORNEY

Patented July 18, 1944

2,354,129

UNITED STATES PATENT OFFICE 2,354,129

STRAIN MEASURING SYSTEM

Bernard F. Langer, Pittsburgh, Pa., assignor to Westinghouse Electric & Manufacturing Company, East Pittsburgh, Pa., a corporation of Pennsylvania Application November 19, 1942, Serial No. 466,147

10 Claims. (Cl. 265—25)

The present invention relates, generally, to systems for continuously indicating or measuring the deflection or strain of a member subject to a stress.

More particularly, the present invention relates to a system of the character mentioned which employs a magnetic type of strain gauge to produce a voltage or current or a change of voltage or current which is indicative of the deflection being measured, the strain gauges in most applications being secured to the member being deflected so that the strain gauge elements may be subjected to movements equivalent to the deflections of the member.

The deflection or strain measuring system as hereinafter described and illustrated in the drawing is specifically adapted for measuring the torsional deflections or twist of a shaft subject to torque, for the purpose of indicating the torque being transmitted by the shaft. It is not to be construed, however, that the invention is limited to this application alone since other forms of strain gauges may be substituted for that illustrated to measure the deflection or strain of a member subject either to tension or compression loading. For an example, reference may be had to the strain gauge illustrated in Patent 2,231,702, S. L. Burgwin, et. al. It will be apparent, however, to one skilled in the art that the specific invention illustrated in the drawing for measuring the torque of a shaft provides accurate torque indication in a degree hitherto unobtainable.

A principal object of the present invention is to provide a system for measuring the deflection or strain of a member subject to a stress which shall function simply and efficiently and have a minimum number of parts.

Another object of the present invention is to provide a deflection measuring system of the character referred to which shall compensate for voltage fluctuations of the source of applied potential.

Another object of the present invention is to provide a deflection or strain measuring system of the character referred to which shall be insensitive to changes in ambient temperature.

Another object of the present invention is to provide a strain gauge control circuit in which a substantially linear relationship between the quantity or voltage to be measured and the current in the indicating instrument coils is obtained.

Figure 2:
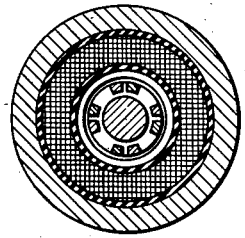

Other objects and advantages will become more apparent from a study of the following specification when considered in conjunction with the accompanying drawing, in which:

Figure 1 illustrates a torque measuring system embodying the principles of this invention; and Fig. 2 is a sectional view taken on the line II—II of the strain gauge of Fig. 1.

The specific strain gauge or torque measuring device schematically illustrated in the drawing is described in detail in a copending application of B. F. Langer and F. W. Godsey, Jr., Serial No. 458,378, filed September 15, 1942, entitled "Torque measuring devices for shafts" and only such description which is necessary for a complete understanding of the construction and operation of the strain gauge will be included in this specification.

Referring now to Figs. 1 and 2 of the drawing, numeral 1 denotes a shaft the torque of which is to be measured; numeral 3 denotes a rotor assembly secured to the shaft and which in effect forms the armature member of the strain gauge, and numeral 5 denotes an annular stationary member which is concentrically positioned about the rotor assembly 3, and in effect forms the core assembly of the strain gauge.

The rotor assembly 3 comprises a pair of axially spaced torque rings 7 and 9 secured to the shaft on bushings (not shown) of non-magnetic material so that a circulating magnetic flux will not include the shaft if the shaft is made of steel or other magnetic material. Centrally disposed between the torque rings 7 and 9 is a third ring 11 termed a reference ring likewise supported and secured to the shaft on a bushing (not shown) of non-magnetic material. The three rings thus secured to the shaft are so axially spaced and supported that a known gauge-length of shaft is included therebetween. The reference ring 11 has secured thereto a plurality of axially extending fingers 13 which extend axially on each side of the ring in the same axial plane. Each of the torque rings 7 and 9 have a plurality of axially extending fingers 15 and 17 which are of sufficient length to overlap the extremities of the fingers 13 associated with reference ring 11. The confronting faces of the cooperating fingers of the three rings are so positioned during assembly that a small airgap is included therebetween and the above-described assembly is such that, for example, if torque were assumed to be transmitted from left to right of the shaft in a clockwise direction, torsional deflections of the shaft between the torque ring 7 and the reference ring 11 would so displace the fingers 15 relative to the fingers 13 cooperating therewith that the airgap 19 formed therebetween would be decreased and the torsional deflections of the shaft between reference ring 11 and torque ring 9 would so displace the fingers 17 relative to the fingers 13 cooperating therewith that the airgap 21 formed therebetween would be increased.

The stationary member 5 comprises an outer annular shell 23 having axially spaced and secured therewithin three ring elements 25, 27 and 29 each of which is positioned to be included in a transverse plane defined by one of the shaft ring elements. The inner bores of the ring elements are of such diameter that small annular airgaps 31, 33 and 35 are formed between the peripheries of the concentrically positioned confronting faces. Included within the two annular recesses formed between the axially spaced rings 25, 27 and 29 are a pair of annular coils 37 and 39 which are each connected as one leg in a conventional Wheatstone bridge circuit which has for each of its other two legs half of the potentiometer 41. Upon suitable energization of the coils from the source of alternating potential connected across the input terminals of the bridge circuit, a flow of alternating magnetic flux may be induced to flow in the stationary member 5 and the rotor assembly 3 in the instantaneous directions indicated by the arrows and for zero torque of the shaft the bridge circuit may be adjusted to a balanced condition by movement of the potentiometer slider 43 across the potentiometer 41. It may now, therefore, be seen that upon torsional deflection of the shaft due to clockwise torque from left to right of the shaft as previously described, the airgaps 19 will be decreased while the airgaps 21 will be increased to substantially proportionally change the values of the alternating magnetic fluxes associated with each of the coils. The alternating magnetic flux associated with one coil being increased while the alternating magnetic flux associated with the other coil is decreased. Thus a voltage in one coil will be increased while a voltage in the other coil will be decreased to cause a voltage difference to appear between the coils. This voltage difference is therefore measurable across the output terminals of the bridge circuit.

The indicating instrument 45 is preferably of the cross coil type and is illustrated diagrammatically. It comprises a stationary permanent magnet 47 and a movable armature positioned to be influenced by the field of the magnet. The armature of the instrument includes a pair of coils 49 and 51 mounted at an angle with respect to each other; the arrangement being such that both coils control the movements of the pointer to provide an indication corresponding to the opposed effects produced by the currents in the coils. Interconnecting the coil 49 of the indicating instrument with the output terminals of the bridge circuit is a circuit comprising a bridge rectifier 53 having its input terminals connected across the output terminals of the bridge circuit, its positive terminal through a resistor 54 connected to one side of the coil 49 and its negative terminal connected to the other side of the coil 49. The second coil 51 of the indicating instrument is connected to the source of alternating potential by a circuit similar to that for the coil 49 including a bridge rectifier 55 having its input terminals across the source of alternating potential, its positive terminal connected through a resistor 56 to one side of the coil 51 and its negative terminal connected to the other side of the coil 51. A series resistor 57 is provided in the circuit connecting the bridge rectifier to the source of alternating potential for the purpose of providing a circuit load substantially proportional to that of the bridge circuit. A further resistor 58 is shunted across the meter coils 51 between the bridge rectifier 55 and the resistor 56. This resistor may be termed a damping shunt and is sometimes needed to reduce the vibration of the instrument coil. This shunt is preferably placed across the coil 51 rather than the coil 49 to avoid placing an additional burden on the strain gauge.

It will be noted upon an inspection of Fig. 1 that both coils 49 and 51 of the indicating instrument 45 are subject to voltage applications from the same source of alternating potential. Since, as previously mentioned, the instrument provides an indication corresponding to the opposed effects produced by the currents circulating in the coils, variations in the source of alternating potential will equally effect both coils of the instrument due to the circuit arrangement, and as a consequence thereof produce no change of indication as would be the case were only one of the coils affected.

It is a well known fact that copper oxide rectifiers have resistance characteristics which vary with the current passing through them; the resistance characteristics also vary with changes in temperature. Such variations are, of course, very undesirable, since any variation from a linear relationship of the voltage supply to the current flowing in the indicating instrument coils will produce a false indication of the quantity to be measured. In order to compensate or correct for this non-linear resistance characteristic, a shunting circuit comprising a pair of shunting discs or rectifier elements 59, the equivalent of those used in the bridge rectifier, and a resistor 60 in series therewith is connected across the output or positive and negative terminals of each of the bridge rectifiers 53 and 55. Each of the resistors 60 are selected to have a resistance value substantially equivalent to that of the circuit on the alternating current side of the bridge rectifiers so that the overall resistance values of the shunting circuits will correspond to the resistance values of the bridge rectifier elements and the alternating current circuits associated therewith. The resistance value of the series resistors 54 and 56 should be of some value greater than the combined resistance of the rectifier elements 59 and resistor 60 in the shunting circuits associated with each, thus for each half-cycle of alternating current, current will flow from the positive terminal of each of the bridge rectifier elements through the indicating instrument coil in circuit therewith. Since resistance characteristics in the shunting circuits are substantially equivalent to those of the corresponding rectifier and alternating current circuits, it will be seen that changes in the characteristic of the bridge rectifier circuits due either to variations in current or in temperature will be substantially duplicated in the changing characteristics of the shunting circuits. Thus, for example, as increasing currents produce a corresponding decrease in resistance in the bridge rectifier, the rectifier elements of the shunting circuit will likewise decrease in resistance with the increase in current, thereby diverging a proportionally greater amount of current from the coil of the indicating instrument associated therewith. In short, since each of the indicating instrument coils taps the midpoint of the voltage drop across the input terminals of the associated bridge rectifier, equal changes of resistance of the bridge rectifiers and the shunt circuit rectifiers will not effect the voltage impressed across the associated instrument coil. Similar considerations, of course, apply to variations of the rectifier resistance characteristic due to temperature changes.

Accurate voltage or current and temperature compensation in each of the instrument coil circuits depends upon the proper relationship between the current flowing in the shunting discs or rectifier elements 59 and that flowing in the instrument coil. This relationship can be established in each circuit by proper selection of the shunt circuit resistors 60 and the series resistors 54 and 56. After these resistors have once been adjusted, however, it is not possible to change the strain gauge sensitivity by changing the meter resistance because that would upset the adjustments compensating for the non-linear bridge rectifier characteristic. The sensitivity is therefore conveniently adjusted by a rheostat 61 which controls the alternating current supply to the whole Wheatstone bridge circuit but which does not include the coil 51 of the indicating instrument.

The operation of the above described apparatus may be set forth as follows: Upon transmission of torque by the shaft, the airgaps 19 and 21, as previously described, will change, one increasing while the other decreases depending upon the direction of the torsional deflection of the shaft. This changes the values of the alternating magnetic fluxes linked with each of the coils to cause a corresponding change in voltage in each coil, whereby a voltage difference appears between the coils as previously described. Thus a voltage difference is caused to appear across the output terminals of the bridge circuit and a voltage proportional to this voltage difference or unbalance of the bridge circuit is impressed across the coil 49 of the indicating instrument.

The coil 51 of the indicating instrument produces a flux component proportional to the applied alternating potential and the coil 49 produces a flux component proportional to the difference of voltage or unbalance existing across the output terminals of the bridge circuit. The resultant of these two flux components causes the armature or crossed coil assembly of the instrument to rotate to a position in which the resultant lines up with the magnetic field produced by the permanent magnet 47. Since both flux components depend upon the source of alternating potential, the effect of variations of the source of alternating potential is eliminated since the flux resultant with respect to the instrument armature depends only upon the relative magnitudes of the flux components. The deflection of the pointer of the instrument 45 is, therefore, in view of the compensation for the variations in the source of alternating potential and the previously described compensation for the non-linear resistance characteristics of the bridge rectifiers, entirely dependent upon the degree of unbalance of the bridge circuit which unbalance being directly proportional to the torsional deflection or torque of the shaft provides an indication accurately indicative of the torque being transmitted.

The foregoing disclosure and the showings made in the drawing are merely illustrative of the principles of this invention and are not to be interpreted in a limited sense. The only limitations are to be determined from the scope of the appended claims.

I claim as my invention:

1. A system for measuring the deflections of a member subject to a stress comprising, in combination, a Wheatstone bridge circuit, at least one electrical coil included as one leg in said bridge circuit, a source of alternating current for energizing said bridge circuit, means in flux linkage with said electrical coil adapted to vary a voltage in said electrical coil in an amount corresponding to the deflections of said member, a meter comprising a first and a second internal circuit providing an indication corresponding to the opposed effects produced by the currents in said internal circuits, a first circuit including a rectifier network having a substantially linear resistance characteristic interconnecting said first internal circuit of said meter with the output terminals of said bridge circuit, and a second circuit including a rectifier network having a substantially linear resistance characteristic interconnecting said second internal circuit of said meter with said source of alternating current.

2. Apparatus of the character set forth in claim 1 in which the rectifier network in said first circuit and the rectifier network in said second circuit each comprise a bridge rectifier and a shunting circuit connected across the output terminals thereof, said shunting circuit including a pair of rectifier elements and a resistor element in series therewith.

3. Apparatus of the character set forth in claim 1 in which said means in flux linkage with said electrical coil comprises a core assembly associated with said electrical coil and an armature member cooperating with said core member.

4. A system for continuously measuring the torque transmitted by a shaft comprising, in combination, a rotatable shaft subject to torque, stationary electrical coil means, a source of alternating current for energizing said electrical coil means, a magnetic flux path including an alternating magnetic flux linked with said electrical coil means, means operable upon elastic deformation of said shaft due to torque for altering the flux linkage with said electrical coil means, thereby changing the value of a voltage in said electrical coil means in an amount corresponding to the elastic deformation of said shaft, a meter comprising a first and a second internal circuit providing an indication corresponding to the the opposed effects produced by the currents in said internal circuits, a first circuit including a rectifier interconnecting said first internal circuit of said meter with said electrical coil means whereby said first internal circuit of said meter has applied thereacross a voltage corresponding to a change in voltage of said electrical coil means, and a second circuit including a rectifier interconnecting said second internal circuit of said meter with said source of alternating current.

5. A system for continuously measuring the torque transmitted by a shaft comprising, in combination, a rotatable shaft subject to torque, a rotor assembly secured to rotate with said shaft, a stationary member disposed in close proximity to said rotor assembly, electrical coil means associated with said stationary member, a source of alternating current for energizing said electrical coil means, said electrical coil being in flux linkage with said stationary member and said rotor assembly upon energization thereof, means included in said rotor assembly for changing the value of the flux linkage when said shaft is subject to torque in an amount corresponding to the torque of said shaft, thereby changing the value of a voltage in said electrical coil means, a meter comprising a first and a second internal circuit providing an indication corresponding to the opposed effects produced by the currents in said internal circuits, a first circuit including a rectifier interconnecting said first internal circuit of said meter with said electrical coil means whereby said first internal circuit of said meter has applied thereacross a voltage corresponding to a change in voltage of said electrical coil means, and a second circuit including a rectifier interconnecting said second internal circuit of said meter with said source of alternating current.

6. A system for continuously measuring the torque being transmitted by a shaft comprising, in combination, a rotatable shaft subject to torque, a rotor assembly having relatively displaceable elements secured to rotate with said shaft, a stationary member disposed in close proximity to said rotor assembly, electrical coil means associated with said stationary member, a source of alternating current for energizing said electrical coil means, said electrical coil means being adapted to induce a flow of alternating magnetic flux in said stationary member and said rotor assembly upon energization thereof, said elements in said rotor assembly being adapted to change the value of said alternating magnetic flux upon relative displacement thereof due to torque thereby changing the value of a voltage in said electrical coil means, a meter comprising a first and a second internal circuit providing an indication corresponding to the opposed effects of currents in said internal circuits, a first circuit including a rectifier interconnecting said first internal circuit of said meter with said electrical coil means whereby said first internal circuit of said meter has applied thereacross a voltage corresponding to a change in voltage of said electrical coil means, and a second circuit including a rectifier interconnecting said second internal circuit of said meter with said source of alternating current.

7. A system for continuously measuring the torque transmitted by a shaft comprising, in combination, a shaft subject to torque, a rotor assembly secured to rotate with said shaft, a stationary member, at least two coils secured to said stationary member, a source of alternating current for energizing said coils, said coils being adapted to induce flows of alternating magnetic flux in said stationary member and said rotor assembly such that each coil has an alternating magnetic flux linked therewith, said coils having voltages therein of substantially equal value when said shaft is not subject to torque, means included in said rotor assembly responsive to torsional deflections of said shaft due to torque for changing the values of the alternating magnetic fluxes linked with each of said coils such that a voltage difference appears between the coils, a meter comprising a first and a second internal circuit providing an indication corresponding to the opposed effects of currents in said internal circuits, a first circuit including a rectifier interconnecting said first internal circuit of said meter with said coils whereby said first internal circuit has applied thereacross a voltage corresponding to the voltage difference between said coils, and a second circuit including a rectifier interconnecting said second internal circuit of said meter with said source of alternating current.

8. A system for continuously measuring the torque transmitted by a shaft comprising, in combination, a rotatable shaft subject to torque, a rotor assembly secured to rotate with said shaft, a stationary member, at least two coils secured to said stationary member, a Wheatstone bridge circuit including each of said coils as one leg thereof, a source of alternating current for energizing said bridge circuit, said coils being adapted to induce flows of alternating magnetic flux in said stationary member and said rotor assembly such that each coil has an alternating magnetic flux linked therewith, said coils having voltages therein of substantially equal value when said shaft is not subject to torque, means included in said rotor assembly responsive to torsional deflection of said shaft due to torque for changing the value of the alternating magnetic fluxes linked with said coils such that a voltage difference appears between the coils, a meter comprising a first and a second internal circuit providing an indication corresponding to the opposed effects produced by the currents in said internal circuits, a first circuit including a rectifier network interconnecting said first internal circuit of said meter with said Wheatstone bridge circuit whereby said first internal circuit of said meter has applied thereacross a voltage corresponding to the unbalance of said bridge circuit which is the difference voltage of said coils, and a second circuit including a rectifier network interconnecting said second internal circuit of said meter with said source of alternating current.

9. Apparatus of the character set forth in claim 8 in which said means included in said rotor assembly comprises a plurality of axially extending finger members supported upon axially spaced ring like elements secured to said shaft, each finger of one axially spaced ring like element being positioned in close proximity to a cooperating finger of another axially spaced ring like element such that a small air gap is formed therebetween.

10. Apparatus of the character set forth in claim 8 in which said rectifier networks each comprise a bridge rectifier having its input terminals connected across the output terminals of said Wheatstone bridge circuit and a shunting circuit shunting the output terminals of said bridge rectifier, said shunting circuit comprising a plurality of rectifier elements and a resistor element in series therewith.

BERNARD F. LANGER.